US006167603B1

(12) United States Patent
Zeiler et al.

(10) Patent No.: US 6,167,603 B1
(45) Date of Patent: Jan. 2, 2001

(54) CHAIR SEAT FRAME SYSTEM

(76) Inventors: Bernhard Zeiler, 318 Saint James Dr.; Howard Christy Willauer, Jr., 124 Kensington Dr., both of Spartanburg, SC (US) 29301

(*) Notice: Under 35 U.S.C. 154(b), the term of this patent shall be extended for 0 days.

(21) Appl. No.: 08/943,444

(22) Filed: Oct. 3, 1997

Related U.S. Application Data

(62) Division of application No. 08/799,314, filed on Feb. 13, 1997, now Pat. No. 5,768,761.

(51) Int. Cl.[7] .......... B23P 19/02
(52) U.S. Cl. .......... 29/281.1; 29/235
(58) Field of Search .......... 29/91.5, 446, 448, 29/91.1, 235, 281.1

(56) References Cited

U.S. PATENT DOCUMENTS

| | | | |
|---|---|---|---|
| 1,864,477 | 6/1932 | Stannard . | |
| 1,930,484 | 10/1933 | Ledwinka | 45/138 |
| 2,804,101 * | 8/1957 | Johnson | 140/109 |
| 4,449,463 | 5/1984 | Gilbride et al. | 112/121.26 |
| 4,509,432 | 4/1985 | Win | 108/51.1 |
| 4,571,864 | 2/1986 | Bopp | 38/102.5 |
| 4,732,097 | 3/1988 | Guilhem | 112/269.1 |
| 5,072,496 | 12/1991 | Radermacher | 29/91.1 |
| 5,189,772 | 3/1993 | Appelt | 29/91.1 |
| 5,430,915 | 7/1995 | Ueda et al. | 26/51 |
| 5,457,864 | 10/1995 | Sakaida | 29/91.5 |
| 5,603,150 | 2/1997 | Assink et al. | 29/91.8 |

* cited by examiner

*Primary Examiner*—S. Thomas Hughes
*Assistant Examiner*—Steven A Blount

(57) ABSTRACT

Apparatus to semi-automatically cover the opening in a chair with a two-way stretch fabric which does not require extensive manual operation by an operator. The fabric is automatically clamped and stretched over the chair opening prior to the clamping thereof by an operator.

6 Claims, 4 Drawing Sheets

CHAIR SEAT FRAME SYSTEM

This is a divisional application of patent application Ser. No. 08/799,314, now U.S. Pat. No. 5,768,761 filed Feb. 13, 1997 for CHAIR SEAT FRAME SYSTEM.

This invention relates generally to a method and apparatus to provide a fabric to cover the opening in the bottom of a chair and more particularly to provide a system to easily and efficiently stretch and attach a two-dimensional stretch fabric over the bottom opening of a chair seat.

Prior to this invention, elastic bands either singularly or woven together were stretched manually over the opening in the bottom of a chair frame and then stapled in position. These elastic bands provide support for cushions and/or upholstery mounted thereover to provide comfort and/or esthetics to the chair.

Therefore, it is an object of the invention to provide a method and apparatus to evenly and efficiently attach a two-dimensional stretch elastic bands over the opening in the bottom of a chair frame.

Other objects and advantages of the inventions will become readily apparent as the specification proceeds to describe the invention with reference to the accompanying drawings, in which.

Figure 8:
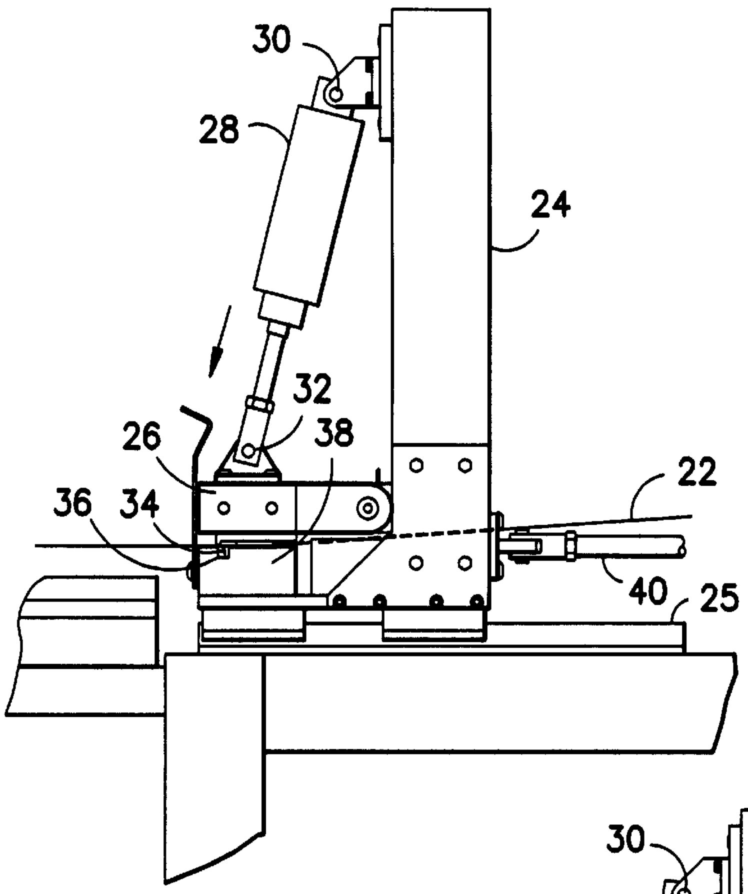
FIGS. 8 and 9 are side views of the chain transverse clamping bar in the actuated and deactivated positions, respectively.
Figure 9:
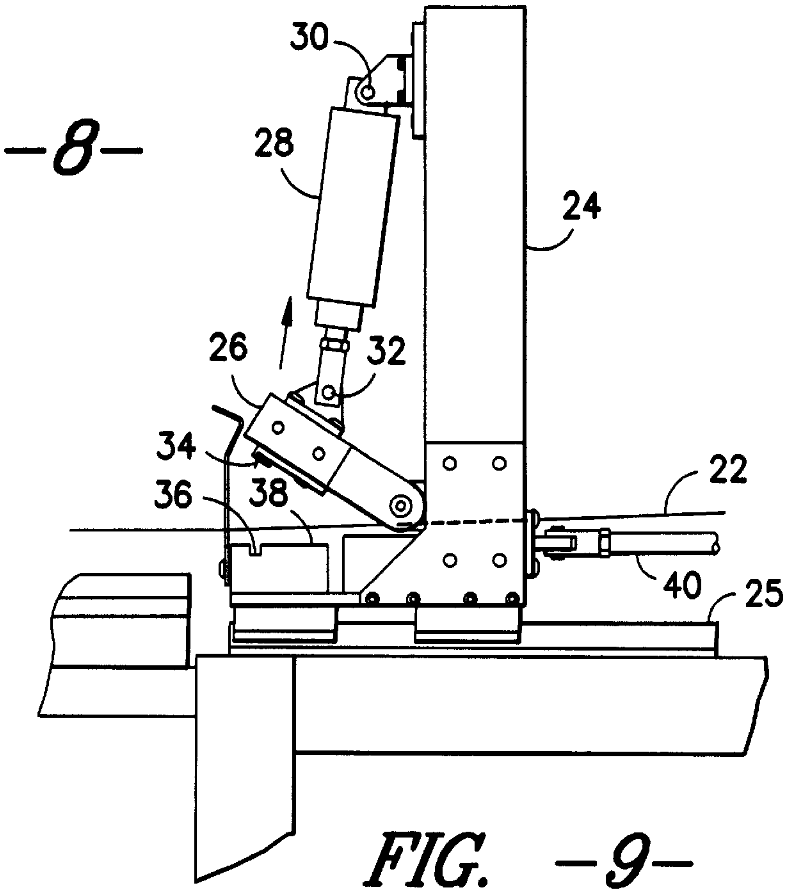

Looking now to FIGS. 1–4, the reference number 10 generally denotes a chair seat stretching machine supported on vertical legs 12 and elongated leg 13 mounted on top of adjustable floor supports 14. Mounted on suitable upright supports 16 connected to cross frame members 18 is a roll of fabric 20 supported by a shaft 21. The fabric 22 is preferably a two-way stretch fabric but can be a one-way stretch fabric in the machine or cross direction if desired. Mounted downstream from the supports 16 are upright support members 24 slidably mounted in a track 25 which are pivoted to the clamping bar 26 the position of which is controlled by the pneumatic actuated pistons 28 pivoted at one end 30 to the support members 24 and at the other end 32 to the clamping bar 26. As shown in FIGS. 8 and 9, the clamping bar 26 has a plurality of pins 34 thereacross to engage the fabric 22 and pass into the cavity 36 of the lower clamping bar 38 slidably located in the tracks 25. A pneumatic piston 40 is pivotally mounted at one end 42 to each of the supports 16 and at the end 44 to the support members 24.

The chair supporting and stretching mechanism is basically cantilevered with the bar member 46 being the main support and running the full length of the machine 10 and being connected to the cross bars 48 and 50. Located below bar 48 is another cross bar 52 for reasons hereinafter explained.

Mounted in the outer end of the bar 46 is a plate 54 of wood or other suitable material on which is supported a pair of upright support members 56 and a pair of lights 58. In operation, the bottom 60 of the chair 62 is supported on the members 56 against the upright projections 57 thereof and held steady by the manually operable clamp 63 when rotated to the position shown in FIG. 4.

Connected to the cross bars 48 and 52 on both sides of the machine are bar members 62 on top of which is a pair of cantilevered elongated bar members 64 and 66. Diagonally located support bars 68 are connected to the bars 64 and 66 at 70 and to the bar members 62 at 71 to support the bars 64 and 66 against the weight of the chair placed thereabove. In the preferred form of the invention, one side of the fabric 22 is clamped in a stationary position and the other side stretched in the manner shown in FIG. 4 but obviously the sliding, clamping member shown at the right in FIG. 4 can also be used individually or jointly on the other side of the chair, if desired.

Mounted on one side of the machine and supported by bar 66 is an elongated bar 72 on which is mounted track 74 which is engaged by the grove 76 in the bottom of clamping members 78. Mounted on the other side of the machine and supported by bar 64 is another mounted track 74 which is engaged by the groove 76 in the bottom of multiple clamping members 78. Clamping members 78 shown in detail in FIGS. 6 and 7 consist of a commercially available valve member 80 pneumatically actuated from air supplied to and from the hose members 82 to pivot the arm 84 upward or downward to disengage or engage the fabric 22 by the pins 86 located in the bottom of the arm 84. As shown in FIGS. 1, 2, 3 and 5, all of the hoses of the valve members 80 are interconnected so that upon the supply or exhaustion of air supplied thereto, they act simultaneously together.

Figure 1:
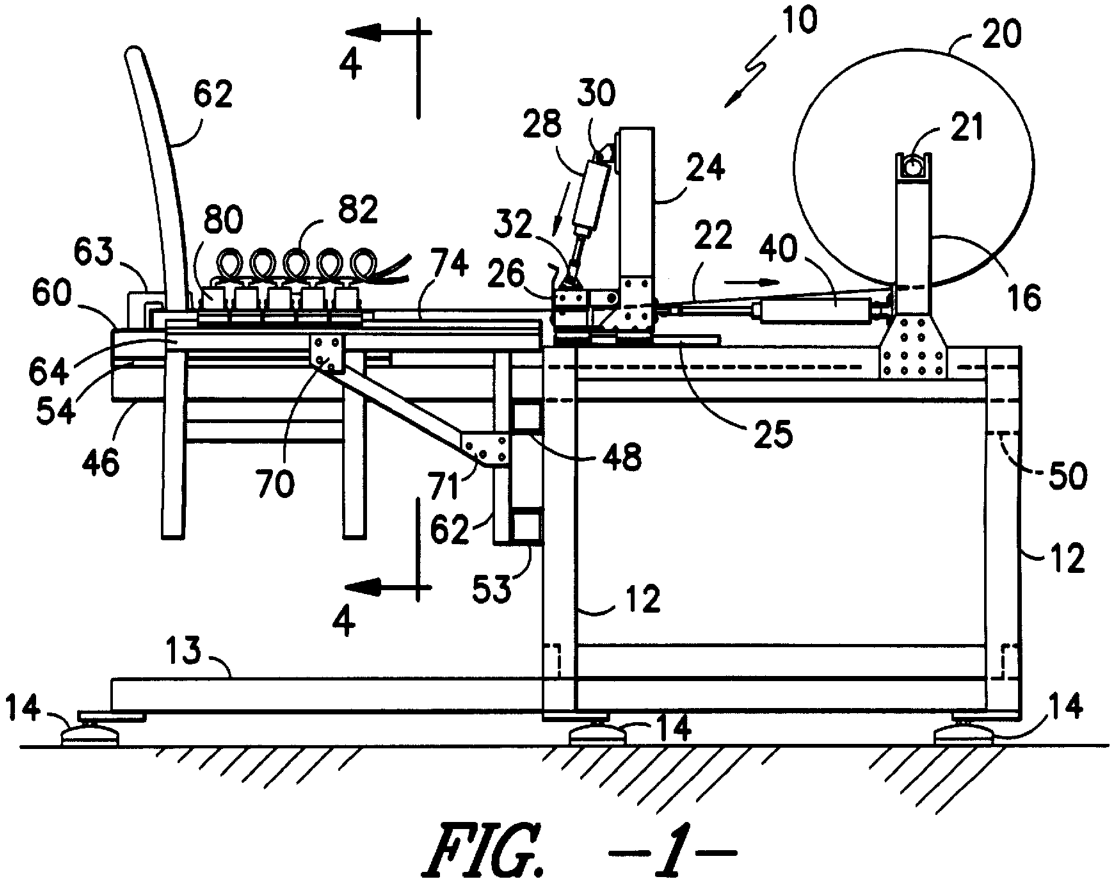
FIG. 1 is a schematic side view of the new and improved seat frame fabric stretching machine.
Figure 2:
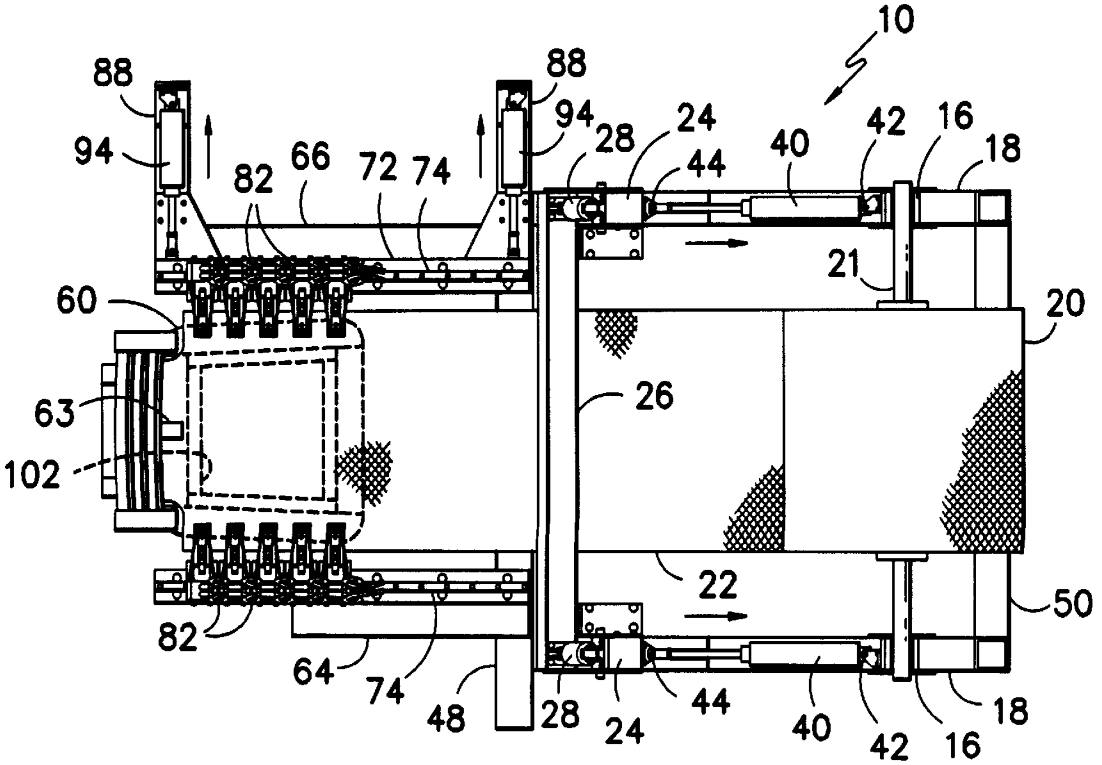
FIG. 2 is a top view of the machine shown in FIG. 1.
Figure 3:
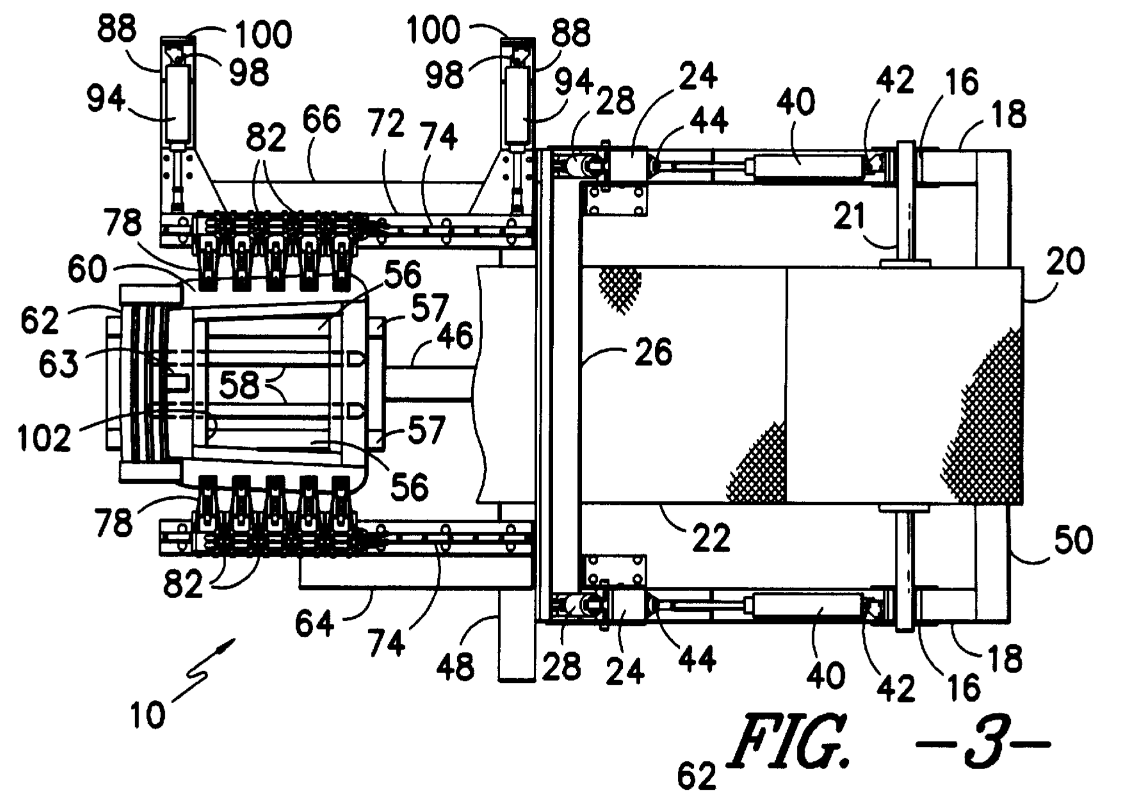
FIG. 3 is a top view similar to FIG. 2 with part broken away to shown details hidden in FIG. 2.
Figure 4:
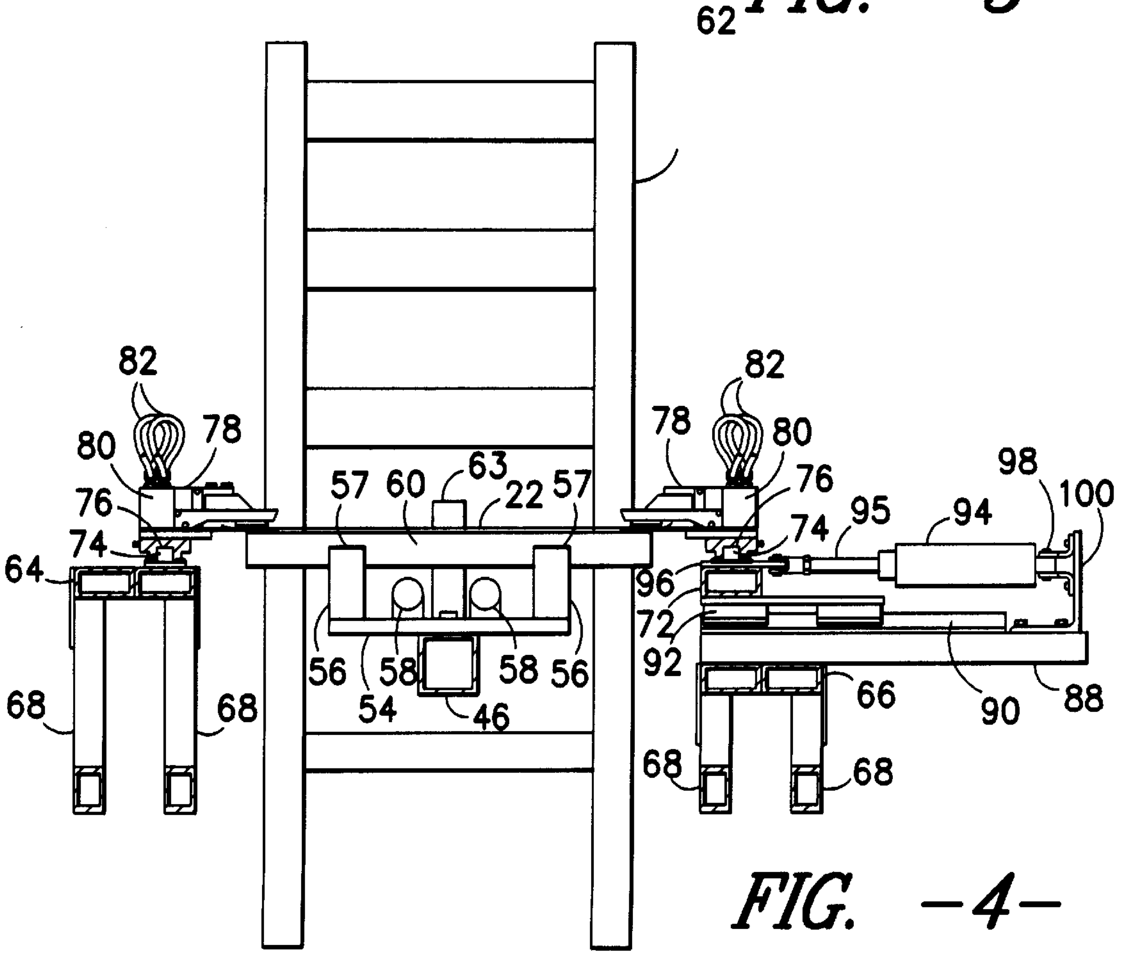
FIG. 4 is a partial section view taken on line 4—4 of FIG. 1.
Figure 5:
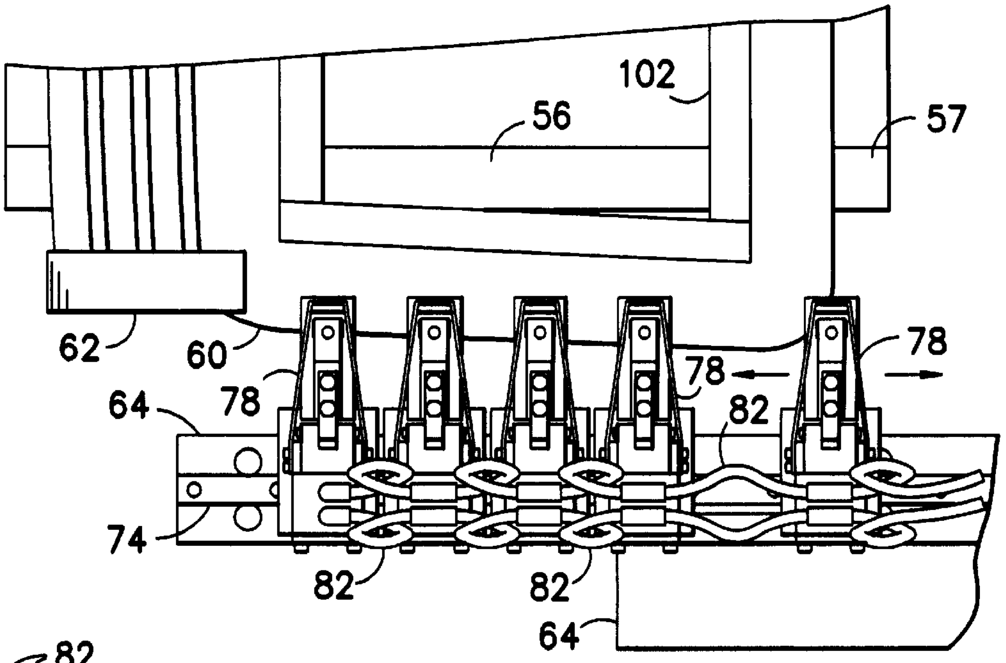
FIG. 5 is a partial top view of the fabric clamps.

As previously mentioned, one side or both sides of the machine can be constructed to provide a stretching of the fabric 22 but in the preferred embodiment as shown in FIG. 4, only one side is so made. Looking in detail at FIG. 4, a pair of bar members 88 with tracks 90 thereon are mounted to the top of supports 66. Located under bar 72 and engaging tracks 90 is track engaging member 92 which is slid back and forth by pneumatically actuated piston 94, the piston rod 95 of which is pivotally connected to plate 96 under track 74 and the other end 98 which is pivotally connected to the L-shaped plate 100 mounted on the end of bar 88.

OPERATION

In the preferred embodiment of the invention, the fabric 22 is a two-bar warp knit weft inserted two-way stretch fabric with the yarn on bar 1 and bar 2 being a single ply, 150 denier, 34 filament solution dyed polyester yarn knit, respectively, with stitch patterns of 1/2, 1/1 and 1/0, 1/1 while the weft inserted yarn is a four ply, 150 denier, 34 filament textured polyester and the warp yarn lay-in is a single ply, 1000 denier black elastomeric monofilament. This fabric, after being knit is rolled up into a supply beam 20 on the shaft 21 and placed into the upright support 16.

Figure 6:
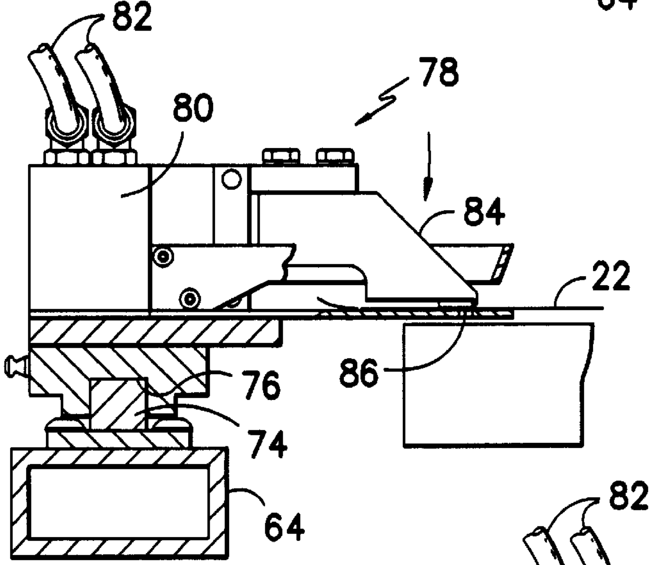
FIGS. 6 and 7 are side views of the clamps in the actuated and deactivated positions, respectively
Figure 7:
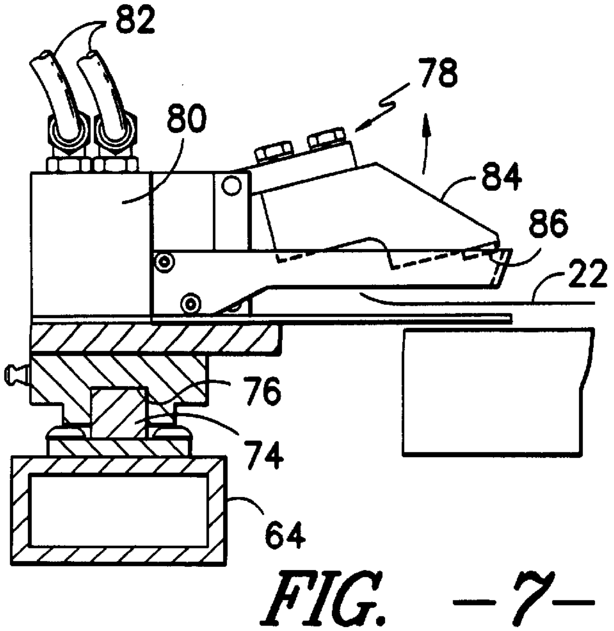

Initially the chair 62 with the opening 102 therein to be covered is placed into the desired position on the upright support members 56. Then the leading edge of the fabric 22 is pulled off the supply roll 20 and delivered to the rear of the chair 62 under the clamping bar 26 and stapled to the back of the chair. Then the clamp 63 is rotated into the position shown in FIGS. 1–3 to secure the position of the chair 62 to be covered. Then a treadle valve, not shown, is activated to instantaneously supply air to all the side clamps 78 to clamp the sides of the fabric 22 as shown in FIG. 6 and, through a time delay valve, pivot the clamping bar 26 into the position shown in FIG. 8 after the clamps 78 have clamped the sides of the fabric 22. As described previously, the pins 34 of the clamping bar 26 and pins 86 of the side clamps 78 penetrate the fabric 22 when actuated to secure the position of the fabric. Then air is supplied to the pneumatic ally operated pistons 40 and 94 to pull the piston rods thereof inward to respectively, stretch the fabric 22 in length and width directions. When the piston rods have been retracted to the desired position to stretch the fabric to the desired position, the fabric is stapled all the way around the outer periphery of the chair to secure the stretched fabric in the desired position. The fabric 22 is then severed from the roll 20, air exhausted from the pistons 28, 40 and 94 to release the fabric, the fabric is trimmed around the edges of the chair, the clamp 63 released and the chair removed from the machine 10. This operation can then be repeated to cover as many additional chairs as required.

It is obvious that herein described is a machine and process to automate a heretofore labor intensive operation which was laborious and inefficient to supply a covered chair product. This automated process ensures that each chair produced will be the same as each other chair produced since the work being produced is not dependent upon human frailties which tend to vary from person to person and from time to time.

The above described machine and process are described for the purposes of illustration only and it is understood that improvements and modifications may be made within the scope of the invention and we desire to be limited only by subtended claims.

We claim:

1. Apparatus to provide a chair with a cover over the opening therein comprising: a frame means supporting a chair with an opening in the bottom thereof on one end of said frame, means supporting a roll of elastic fabric on the opposite end of said frame, first clamping means located in said frame between said chair supporting means and said fabric roll supporting means, a second fabric clamping means mounted on both sides of said frame adjacent said chair supporting means, means operably associated with the second fabric clamping means on one side of said frame to slide the second fabric clamping means on said one side in an outward direction to stretch said fabric when it is laid on a chair supported by said chair supporting means and a second means operably associated with said first clamping means to stretch the elastic fabric in the longitudinal direction of said frame when said first clamping means have engaged said elastic fabric.

2. The apparatus of claim 1 wherein all of said clamping means have pins in the bottom thereof to engage the elastic fabric.

3. The apparatus of claim 2 wherein said means operably associated with all of said clamping means are pneumatically operated piston members.

4. The apparatus of claim 3 where said chair supporting means includes means to clamp the chair in a fixed position when said fabric is being stretched.

5. The apparatus of claim 1 wherein said frame includes a rectangular frame supporting said first clamping means and said fabric roll and a cantilevered support member projecting from said rectangular frame supporting said chair mounting means and said second clamping means.

6. The apparatus of claim 5 wherein each of said clamping means have pins in the bottom thereof to engage the elastic fabric.

* * * * *